United States Patent [19]

Jackson

[11] 3,922,537

[45] Nov. 25, 1975

[54] MULTIPLEX DEVICE FOR AUTOMATIC TEST EQUIPMENT

[75] Inventor: Philip C. Jackson, Mahwah, N.J.

[73] Assignee: Instrumentation Engineering, Inc., Franklin Lakes, N.J.

[22] Filed: Sept. 26, 1974

[21] Appl. No.: 509,992

[52] U.S. Cl. .......................... 235/153 AC; 324/73 R

[51] Int. Cl.$^2$ .......................................... G01R 31/28

[58] Field of Search ...............235/153 AC; 324/73 R, 324/73 AT; 340/172.5

[56] References Cited

OTHER PUBLICATIONS

E–H Research Laboratories, Inc., 4500/4600 Series Automated Test Systems, pp. 11–17.

*Primary Examiner*—R. Stephen Dildine, Jr.
*Attorney, Agent, or Firm*—Morgan, Finnegan, Pine, Foley & Lee

[57] ABSTRACT

The present invention pertains to multiplex apparatus for an automatic computerized diagnostic testing system for selectively interconnecting peripheral measurement and stimulus devices to a unit under test (UUT) through various switching subsystems which differ in switching capability, load carrying ability, frequency bandwidth, and mode of operation. The multiplexer includes plural conducting means between each pin of the circuit under test and corresponding terminals or test points of plural switching sub-systems used to interconnect UUT pins and the peripheral testing devices. Each plural conducting means includes controllable switch means. These switch means operate automatically under programmed computer control. One of the switching subsystems has high frequency signal carrying ability, and the conducting means associated with this subsystem preferably include impedance matching buffers, and have a frequency bandwidth equal to that of the subsystem.

13 Claims, 7 Drawing Figures

MULTIPLEXER -UUT POINT ADDRESSES - WDB 1

| UUT PIN | 1* | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1-16 | 78 | 70 | 68 | 60 | 58 | 50 | 48 | 40 | 38 | 30 | 28 | 20 | 18 | 10 | 08 | 00 |
| 17-32 | 79 | 71 | 69 | 61 | 59 | 51 | 49 | 41 | 39 | 31 | 29 | 21 | 19 | 11 | 09 | 01 |
| 33-48 | 7A | 72 | 6A | 62 | 5A | 52 | 4A | 42 | 3A | 32 | 2A | 22 | 1A | 12 | 0A | 02 |
| 49-64 | 7B | 73 | 6B | 63 | 5B | 53 | 4B | 43 | 3B | 33 | 2B | 23 | 1B | 13 | 0B | 03 |
| 65-80 | 7C | 74 | 6C | 64 | 5C | 54 | 4C | 44 | 3C | 34 | 2C | 24 | 1C | 14 | 0C | 04 |
| 81-96 | 7D | 75 | 6D | 65 | 5D | 55 | 4D | 45 | 3D | 35 | 2D | 25 | 1D | 15 | 0D | 05 |
| 97-112 | 7E | 76 | 6E | 66 | 5E | 56 | 4E | 46 | 3E | 36 | 2E | 26 | 1E | 16 | 0E | 06 |
| 113-128 | 7F | 77 | 6F | 67 | 5F | 57 | 4F | 47 | 3F | 37 | 2F | 27 | 1F | 17 | 0F | 07 |
| 129-132 | 84 | 85 | 86 | 87 | | | | | | | | | | | | |
| 133-139 | B8 | B0 | A8 | A0 | 98 | 90 | 88 | | | | | | | | | |
| 140-146 | B9 | B1 | A9 | A1 | 99 | 91 | 89 | | | | | | | | | |
| 147-153 | BA | B2 | AA | A2 | 9A | 92 | 8A | | | | | | | | | |
| 154-160 | BB | B3 | AB | A3 | 9B | 93 | 8B | | | | | | | | | |
| 161-167 | BC | B4 | AC | A4 | 9C | 94 | 8C | | | | | | | | | |
| 168-174 | BD | B5 | AD | A5 | 9D | 95 | 8D | | | | | | | | | |
| 175-181 | BE | B6 | AE | A6 | 9E | 96 | 8E | | | | | | | | | |
| 182-188 | BF | B7 | AF | A7 | 9F | 97 | 8F | | | | | | | | | |
| 189-192 | 80 | 81 | 82 | 83 | | | | | | | | | | | | |

* ADDRESSES ARE LISTED IN HEXADECIMAL

FIG. 5

MULTIPLEX DEVICE FOR AUTOMATIC TEST EQUIPMENT

BACKGROUND OF THE INVENTION

This invention relates generally to automatic computerized diagnostic testing systems for testing electrical components and circuits and is useful in particular with systems of the type disclosed and claimed in the copending application of Ernest H. Ehling, et al., entitled "Computerized Diagnostic Test System", Ser. No. 153,902, filed June 15, 1971 and assigned to the assignee of the present invention. To better understand the present invention, it will be helpful to briefly describe these diagnostic testing systems.

In general, they operate by automatically connecting units under test (UUT's) to electrical stimulus and measurement devices to be used in the test. Connections are made through an electrical switching subsystem automatically controlled under programmed computer control. By means of the switching subsystem, stimulus and response signals are conducted to and from the UUT circuit terminals and external device terminals. The actual electrical response is then compared by the computer to a standard acceptable response. In this way the electrical components and circuits are tested for defects.

Within the switching subsystem, an electrical signal is routed between an external testing device terminal and a UUT terminal via one of several conductive buses; switch means associated with each device and UUT terminal are controllably operative to connect that terminal to any one of the buses under control of the computer's switch control means, one of the free buses is selected and the switch means associated only with that bus is activated to make the desired connection.

Switch means in such a system may include a first controllable switch between the terminal in question and one of several separately controllable switches for opening and closing the selected series circuit between the terminal and the selected bus. The switches are operated by signals generated by the computer at the appropriate times during the test procedure. Any possible interconnection of terminals can be made, up to the number of buses used.

Testing systems of the type described, which incorporate a single switching subsystem of fixed electrical characteristics, are limited in performance to testing procedures compatible with these characteristics. For example, a standard general switching subsystem ("GSS"), such as described above, may use read type relays which cannot operate without damage when carrying more than one ampere of current. This limitation does not impair the testing of some conventional electrical circuits and components; however, some circuits, such as those used in digital computers, aircraft, and weapons systems, require prime power or simulated loads to be applied in a random fashion across their interface pins. As a result, the pins or junctures in such circuits must be able to operate under increased power. Consequently, in order to adequately test pins of this type, signals with associated current which exceeds the current limit of the GSS must be transmitted to the pins of the UUT.

In order to perform these high power tests, a power switching subsystem ("PSS") is preferably used. Such a subsystem comprises heavier conductors and relays than those of the GSS and may, for example, carry signals with associated current of up to five amperes without damage to its components. However, due to the presence of heavy duty components in a power switching subsystem, which are necessary to allow the transmission of higher current, the capacitance of the circuits between the switched in terminals is increased, and cross talk between circuits can constitute a problem at higher signal frequencies. Consequently, the frequency bandwidth associated with a power switching subsystem (0–400KHz) is significantly lower than that of the general switching subsystem (0–2MHz). Thus, high frequency tests are performed using switching subsystems other than the power switching subsystem.

High frequency circuitry includes components capable of passing high frequency signals (30–40 MHz) without significant distortion. To fully test such components at rated operating frequencies, the testing system should be capable of supplying signals of such frequencies to the UUT and of measuring response signals of such frequencies emitted by the UUT. Accordingly, in order to automatically test components and pins of this type, a high frequency switching subsystem ("HFSS"), capable of transmitting such high frequency signals without significant distortion, is desirable. Such a subsystem should preferably be capable of transmitting electrical signals having associated frequencies of up to 100 MHz. The components of the HFSS, in order to obtain the required high frequency performance, are of relatively low current rating.

Another type of testing system which is useful, particularly for the testing of digital circuitry, is what is known to those skilled in the art as parallel testing. This involves simultaneous transmission of a number of electrical pulses or bits (i.e. a digital word) to certain pins of a UUT and the generally simultaneous measurement and logic analysis of the responses emitted at other pins of the UUT. To perform this type of testing, a digital word generator and receiving (DWG/R) device is required. It may have its own internal switching for applying and receiving signals at various UUT pins. Such a device should be capable of generating and receiving multibit digital words applied to or received from a UUT in response to controlling computer command. A device of this type is disclosed in U.S. Pat. No. 3,832,535.

It has been the practice to equip computerized diagnostic testing systems with either a GSS, PSS or HFSS type switching subsystem, and with or without a DWG/R device, but not generally with more than one permanently interconnected switching subsystem.

Therefore, up until the present invention, automatic testing systems have not been capable of performing parallel testing, as well as more than one of the other types of testing which have been described without some modification of the system as by interchanging the switching subsystem. Thus, in order to carry out tests of a wide range with respect to stimulus signal and response signal characteristics, and thereby to effectively test modern electrical components and circuits, it has been necessary to employ a series of separate tests, using separate automatic testing systems and switching subsystems for each type of testing, and in some cases using manual testing techniques for the high power and high frequency testing.

One object of the present invention, therefore, is to overcome the aforementioned difficulties by providing a multiplexer system which allows the testing of electrical components and circuits of widely varying electrical characteristics by a single integrated automated computerized diagnostic testing system.

Another object of the present invention is to provide a multiplexer system which enables testing to be carried out with switching circuits that can be selected according to their characteristics and compatibility with the test being undertaken. Thus the invention allows the integration into a single automated computerized test system of several types of switching subsystems.

A further object is to provide a single automated computerized diagnostic testing system with the capabilities of GSS, PSS and HFSS type switching subsystems and a digital word generating receiving device.

A particular object of the invention is to provide multiplexer apparatus that will enable an automated computerized diagnostic testing system to connect UUT pins to a DWG/R device and to stimulus and measurement devices by means of a GSS, PSS or HFSS type switching subsystem, automatically selected in accordance with the requirements of a designated test or test step.

SUMMARY OF THE INVENTION IN BRIEF

Briefly, the present invention comprises multiplexer circuits for effecting connections between a plurality of stimulus and measurement devices and the pins of a UUT. Each multiplexer circuit comprises a number of switched electrical routes, or branches, leading from one UUT pin to respective switching subsystems or DWG/R devices. These branches vary in electrical signal carrying ability; preferably one is adapted to transmit high power signals and another adapted to transmit high frequency signals. In preferred embodiments, each route of each multiplexer circuit is switched, under computer control, to a terminal or test point in one of the switching subsystems or DWG/R device. Switching (connection and disconnection) of the respective branches is carried out in response to computer signals generated in accordance with the dictates of a computer coded test program.

BRIEF DESCRIPTION OF THE DRAWINGS

A better understanding of the invention, together with its attributes and its mode of operation, will be had from the following detailed description and accompanying drawings, wherein:

FIG. 5 is a table showing the computer addresses of pins of a unit under test and the multiplex circuits associated with them.

DETAILED DESCRIPTION OF PREFERRED EMBODIMENTS

In order to afford a complete understanding of the invention and an appreciation of its advantages, a preferred embodiment is presented below in the context of a practical environment including several types of switching subsystems constituting part of a comprehensive testing system embracing the following elements: a general switching subsystem (GSS); a power switching subsystem (PSS); a high frequency switching subsystem (HFSS); a digital word generating/receiving device (DWG/R)/a multiplex subsystem (MUX); a unit under test (UUT) interface or connector; stimulus and measurement devices; and a supervisory computer.

To understand the operation of the multiplex apparatus in this environment, it is advantageous to consider the workings of the GSS, PSS, HFSS and DWG/R device.

Figures 1, 2:
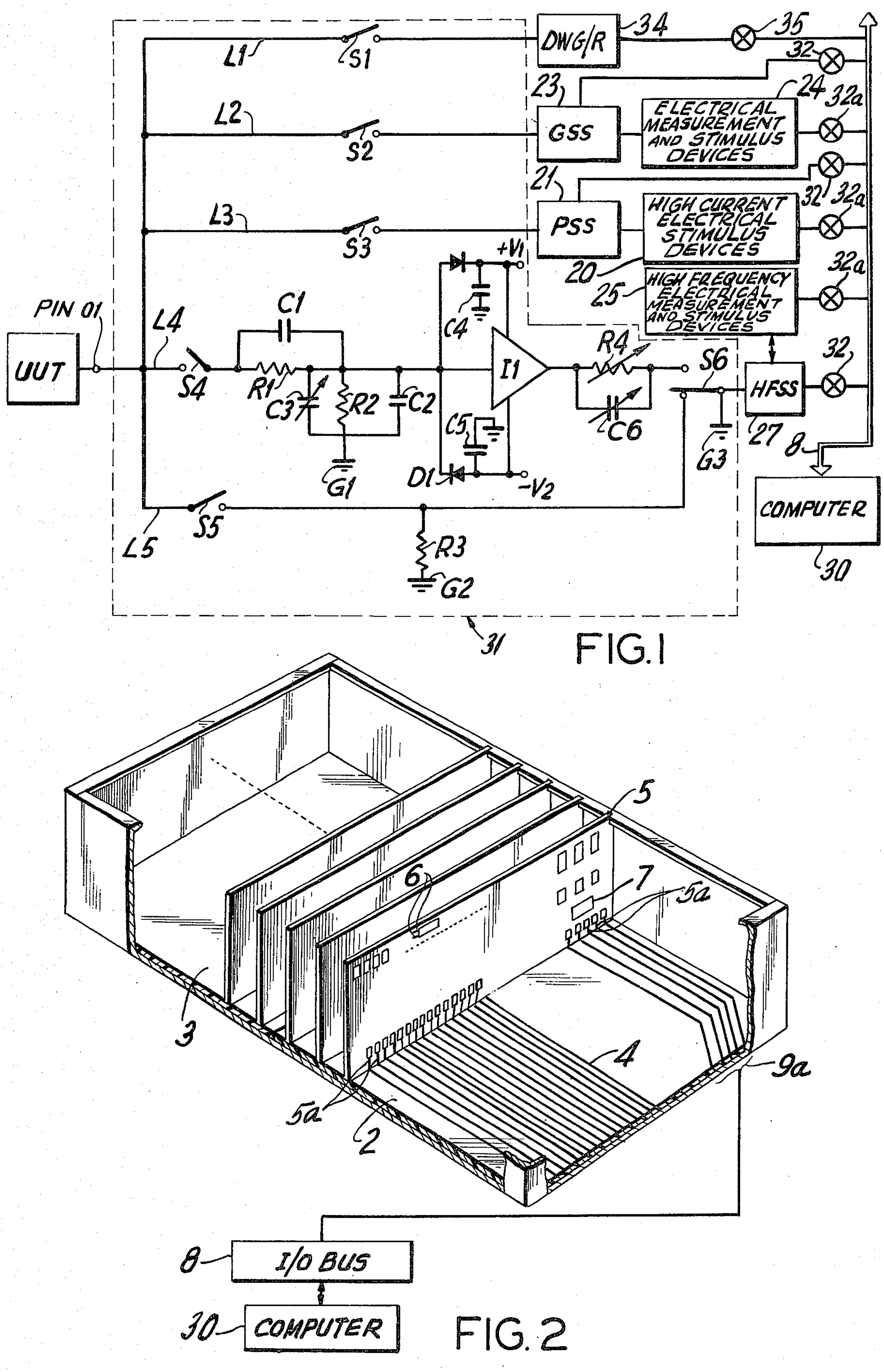
FIG. 1 is a schematic electric circuit diagram of a preferred multiplexer circuit in accordance with the present invention.
FIG. 2 is a top perspective view of various typical physical components of a switching subsystem with which the present invention may be used.

Referring first to FIG. 2, the components of a switching subsystem (e.g., the GSS) are physically contained within a drawer 1. Two printed circuit chassis or "mother boards", 2 and 3, are positioned adjacent to one another in the horizontal plane in the bottom of the drawer. Extending along each chassis are eighteen electrically conductive buses 4. Each chassis holds 19 identical printed circuit cards or "daughter boards" 5 vertically positioned in parallel relationship to one another. These daughter boards are removable and include edge conductors **5*a* which make electrical connection with suitable receptacles (not shown) associated with the buses 4 and another set of conductors 9*a* on the mother boards. Each circuit card contains two test points 6 and associated relay networks for selectively connecting each test point to any one of the 18 buses 4. In addition, on each card there is a logic element or device controller 7 which is connected to the input/output (I/O) bus 8 of an associated digital computer 9 by the control conductors 9*a*** which receive computer commands. Logic circuits on each card respond to the computer commands so as to activate or deactivate designated switches in the relay networks.

Each of the 76 test points in the drawer is connected by wiring either to an external device (stimulus or measurement type) or, through the multiplexer (MUX) subsystem, to a UUT pin. Thus, to connect one of the devices, for example, to a particular UUT pin, a circuit is established by closing appropriate switches (relays) in the switching subsystem so that the device terminal (wired to one of the test points 6) is connected to one of the conductive buses running along the bottom of the chassis while another of the test points 6 (wired through the multiplexer sub-system to the designated UUT pin) is connected to the same bus.

If the device is associated with the GSS, the relays in the relay networks on each "daughter board" of the GSS are one ampere reed relays. In practice, this means the GSS can carry signal currents up to 2 amperes without damage when its relays are closed and its relays can be operated without damage when carrying up to 1 ampere of current. Preferably, the GSS has a signal bandwidth of at least 0–2MHz. The switching subsystem and its operation are described in detail in the co-pending application of Ernest H. Ehling et al., entitled "Computerized Diagnostic Test System", Ser. No. 153,902, filed June 15, 1971 and assigned to the assignee of the present invention.

Connections requiring heavier current capacity are established through the PSS. Physically and operationally, this power switching subsystem is identical to the GSS just described. Its relationship to the system differs from the GSS, however, in that all PSS test points 6 are wired either to a stimulus device (e.g., a power supply) terminal or to a UUT pin. Generally these stimulus devices will be high current devices such as fixed and programmable power supplies whose outputs can exceed one ampere when feeding low impedance loads. Also, the relays on the "daughter boards" in the PSS are five ampere ½ crystal can relays. The PSS can carry signals with associated current of up to 5 amperes when its relays are closed. Its relays can open and close without damage when carrying up to 2 amperes. The operation of the relay networks and buses in the PSS (i.e. the way in which buses are used to connect designated test points) is the same as in the GSS.

Measurements requiring the transmission of high frequencies between the UUT and external devices of the system are made via the HFSS. The HFSS is contained within a third drawer in a manner similar to that in which the GSS and PSS are contained within their respective drawers. Minor differences in physical detail between the HFSS and those earlier described are that the HFSS has 32 "daughter boards", each with eight rather than two test points 6. More significant differences reside in the frequency characteristics. Specifically, the characteristic impedances of the wires and the components of the HFSS are matched at 50 ohms in order to assure that a frequency bandwidth of 0–100 MHz is maintained. Coaxial wiring with 50 ohm characteristic impedance is used to connect the HFSS to points outside the drawer. The HFSS can carry signals with associated current of up to ½ ampere without damage. Each test point in the HFSS is wired to either a stimulus device, a measurement device or, through the multiplexer subsystem, to a UUT pin. The operation of the relay networks and buses in the HFSS is carried out in a manner substantially the same as in the GSS and PSS.

Figure 3:
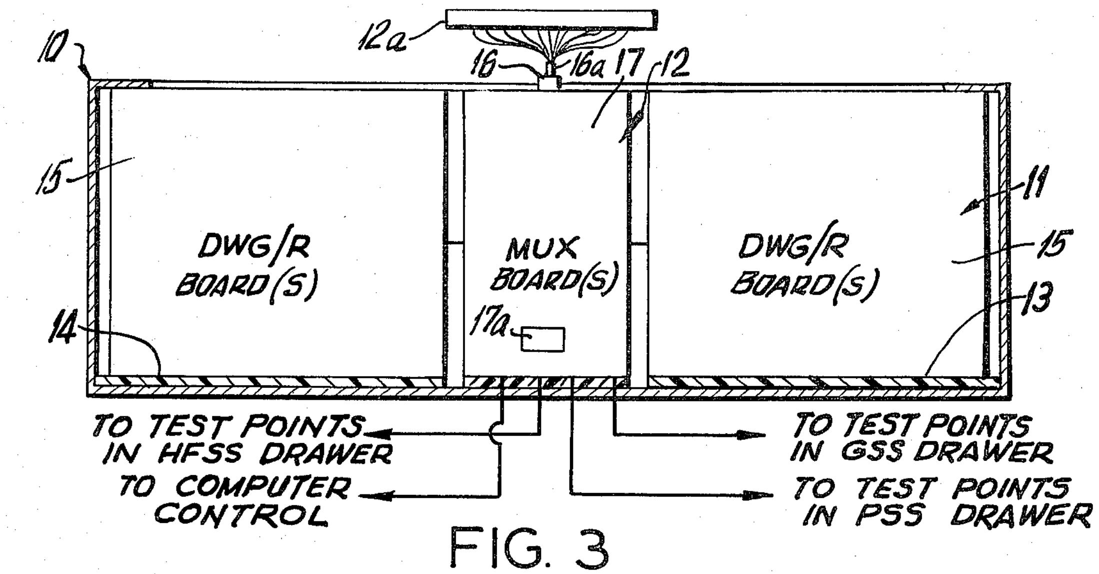
FIG. 3 is a diagrammatic elevation view illustrating the general physical implementation of a multiplex subsystem and digital word generating/receiving device in a drawer containing electrical elements on printed circuit cards.

Referring now to FIG. 3, in a fourth drawer 10 are contained both the digital word generator/receiver device (DWG/R) 11 and the multiplexer subsystem 12. Preferably, this drawer is located closely adjacent the test fixture receptacle, e.g., a few inches below the test fixture 12*a* in order to keep the length of conductive leads short and thereby to minimize undesirable effects such as stray capacitance. The DWG/R consists of two chassis or "mother boards", 13 and 14, one positioned on each side of the multiplexer unit, 12. Each chassis of the DWG/R contains 32 "daughter boards" 15; each in turn having four test points (not specifically shown) associated respectively with digital word generating and receiving circuitry that is identical for each test point. The circuits and operation of such a DWG/R subsystem is described in detail in U.S. Pat. No. 3,832,535 to Louis DeVito entitled "Digital Word Generating and Receiver Apparatus". In general, the DWG/R operates under computer control so as to transmit several digital stimulus pulses simultaneously or sequentially (i.e., a parallel or serial digital word) to the UUT, the digital pulses going to designated pins. It then measures the responses emitted at these pins and compares them with a standard signal pattern representing the correct expected response.

As indicated in FIG. 3 by the arrows, all test points between the GSS, PSS, HFSS and DWG/R, on the one hand, and the UUT pins on the other hand are interconnected through the multiplex subsystem. Conventional conductive wiring is used between the various switching subsystems and the circuits in the multiplex subsystems. Similarly, a cable of conductors 16*a* from the test fixture 12*a* converts the UUT pins to the MUX system 12 via the connector 16. As earlier mentioned, test points associated with the HFSS are brought from the UUT pins to the MUX with coaxial conductors having a characteristic impedance of 50 ohms.

Again referring to the front elevational view of FIG. 3, the multiplex subsystem assembly 12 comprises 32 circuit boards 17. Each board contains eight channels or multiplex circuits; that is, it includes circuits sufficient to multiplex eight separate UUT pins to any of the switching subsystems or DWG/R. As such, each circuit is identical (as will be described shortly in connection with FIG. 1) and each is switchably connected to a UUT pin and four test points operatively associated with that pin: one in the GSS, one in the PSS, one in the HFSS and one in the DWG/R device. These circuits act under computer control to connect designated devices to designated UUT pins via one of the switching subsystems, or to connect the DWG/R to the UUT pins directly. Each multiplex circuit board, 17, like the circuit boards in the other subsystems, has a logic element or device controller, 17*a*, and associated digital circuitry electrically connected to the I/O bus of the controlling digital computer and adapted to receive computer commands and control the multiplex circuits on the card in accordance with these commands.

Figure 6:
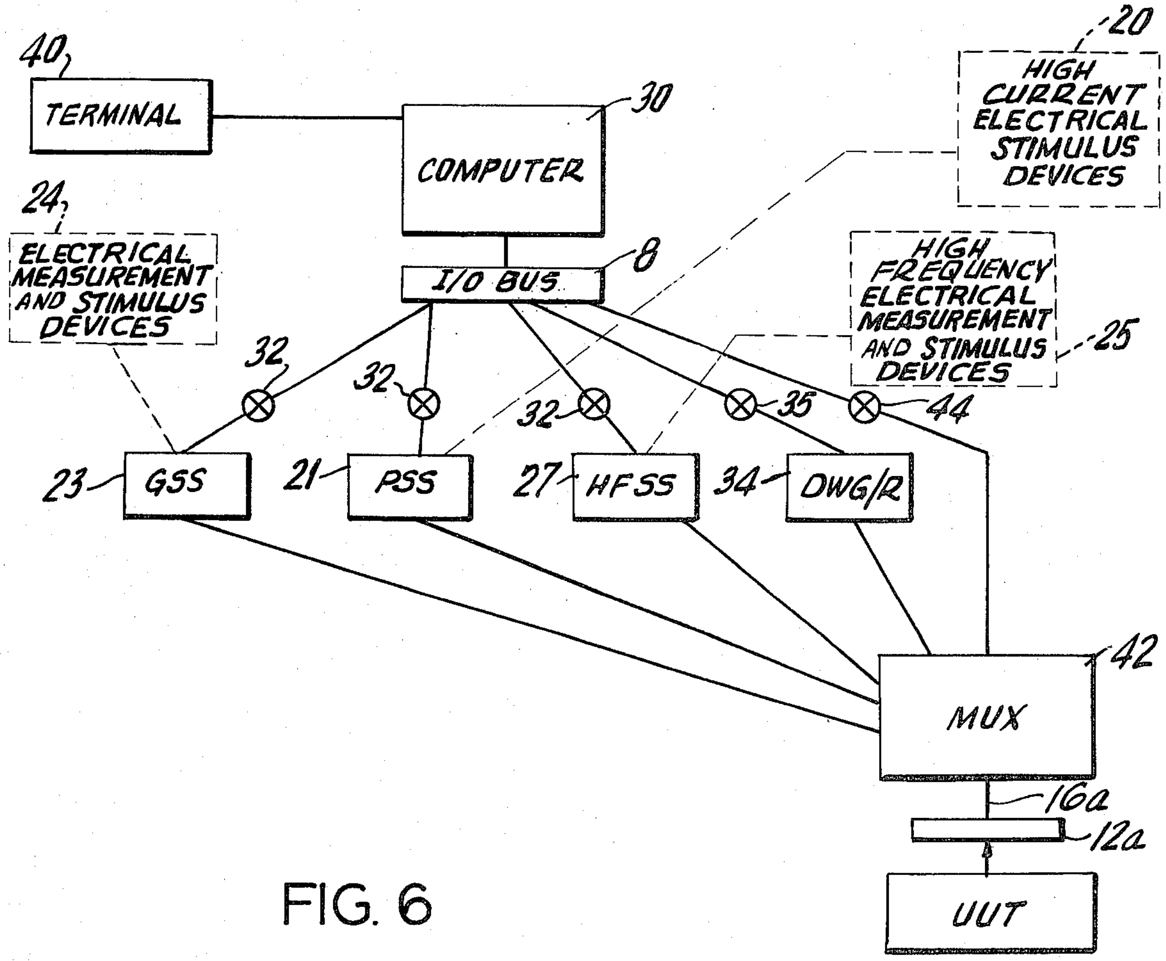
FIG. 6 is a schematic drawing of a diagnostic testing system incorporating a multiplexer apparatus according to the invention.

For example, if the test program specifies that a 5 volt – 3 ampere signal is to be placed on UUT PIN 38, the computer would address the device and switching subsystem (e.g., PSS) so as to establish an internal connection in the switching subsystem between a programmable power supply output terminal and the test point connected to UUT PIN 38 through the MUX subsystem. The manner in which this is accomplished is explained in the above U.S. patent application Ser. No. 153,902. In general, the signal would be routed over one of the free internal buses between test point 38 and the power supply test point. The multiplex circuit, when addressed, then would select the PSS in order to apply the 5 volt – 3 ampere signal to UUT PIN 38. If a different device was selected, e.g., a low frequency signal generator, the same sequence of events would occur, except involving the GSS. This operation will be better apparent from FIGS. 1 and 6 showing how the multiplexer MUX interacts with the other elements of the total system.

The schematic drawing in FIG. 1 depicts the basic configuration of each multiplex circuit associated with a single UUT pin. Thus, the multiplex 12 desirably consists of a number of circuits just like that of FIG. 1, up to the number of UUT pins used. The circuitry shown is that which, in accordance with the invention, can establish connections between UUT pins and devices via plural switching subsystems.

As indicated in FIG. 1, each of the switching subsystems is associated with a particular class of external ("peripheral") devices compatible with the capability of the switching subsystems. Thus devices 20, such as programmable or fixed voltage sources, are wired to test points in the PSS unit 21, which can accommodate the higher currents generally encountered with prime power excitation. Test points of the GSS 23, on the other hand, are wired to lower current stimulus and measurement devices 24 which do not require high frequency response, i.e., frequencies in excess of 2MHz. High frequency devices 25 (measurement and stimulus whose frequency range may exceed 2MHz) are wired to test points on the HFSS unit 27.

As a result of the foregoing arrangement, when a test step involves a particular device, the switching subsystem associated with that device will be addressed by the computer 30 in order to establish the connection between the device's output (or input) terminal and the UUT pin test point wired to the multiplexer circuit 31, described below. It should be understood that eaach of the external devices is connected to the computer I/O bus, 8, through suitable addressable device controllers, 32*a*, so that it is operated in response to computer commands at appropriate times during the test step sequence. Likewise, the DWG/R, 34, is operated through its device controller, 35, and the HFSS, 27, GSS, 23, and PSS, 21, are operated through their device controllers, 32. The sequence of events, then, is to determine which device is required by the test step; to address that device and to perform any necessary operative steps in order to set it up for the operation (e.g., ranging a digital voltmeter or programming a supply voltage); to address the particular switching subsystem wired to that device and to establish the connections required between the device and the specified UUT pin; and lastly to complete the circuit to the actual UUT via the MUX 12.

Referring momentarily to FIG. 6, the relationship of the multiplexer subsystem, 42, (comprising several circuits, 31) to the entire system can be better seen. The supervisory computer, 30, e.g., an Interdata Model, 70, receives instructions to perform certain analytical tests by means of a suitable operator's terminal, 40, such as a keyboard, magnetic tape reader, punched paper tape or disc, etc. Connection is then established in accordance with computer command through one of the switching subsystems (GSS, 23, PSS, 21, or HFSS, 27) and the multiplex subsystem, 42, which communicates with the I/O bus, 8, through its own device controller, 44.

The I/O bus, 8, as those skilled in the art understand, comprises a number of conductors over which data and command signals to and from the computer are transmitted. Each stimulus and measurement device and each subsystem (GSS, PSS, HFSS, DWG/R, and the multiplexer) is controlled by commands from the computer. These commands are those which instruct a certain device to apply or receive a signal or signals to and from designated UUT pins. Similarly, those commands also dictate the required closing and opening of relays in the switching and multiplex subsystems.

A test program, usually constituted of a series of operational steps to be performed upon the UUT by the equipment, is entered into the computer through the operator's terminal 40 (FIG. 6). The test program language has been designated as the adapted "ATLAS" ("abbreviated test language for avionics systems") type, which is easily adapted to the universal testing of all types of electrical systems. Adapted "ATLAS" (hereafter referred to simply as ATLAS) utilizes an abbreviated, English word vocabulary dealing with test functions commonly encountered in electrical systems. It is this language that the operator, through the terminal 40, uses to communicate with the equipment and to control the nature and sequence of the test steps. Desired circuit connections between the pins of the UUT and terminals of the measurement and stimulus devices through appropriate multiplex circuits 31 and switching subsystems (21, 23, 27) are established simply by issuing an instruction to perform some test or function involving UUT pins.

The operating software is distinguished from the test program entered by the operator. The operating software is contained in the computer memory and forms the internal rules of machine operation. The "ATLAS" program is the comprehensible source language which is compiled by the computer into a type of object code for processing and execution by the resident software.

The basic operating software of the testing system to which the software of the preferred embodiment of the present invention is a modular addition, is described in detail in the aforesaid co-pending application Ser. No. 153,902. The multiplex software is a part of the overall testing system operating software and will be described shortly.

Returning again to FIG. 1, the elements of a multiplexer circuit 31 for a typical UUT pin, "PIN 01", are shown, there being one such circuit for each UUT pin to be capable of multiplexed connection. In this connection, it is understood that "multiplex" is used in the sense that a particular signal point (e.g., PIN 01) is shared by alternately selectable signal paths. The MUX unit 42 in response to a computer command selects one of such signal paths by routing signals over one of the links L1–L5 that lead from the UUT pin to the switching subsystems 21, 23, 27 and to the DWG/R 34. The link is established by closure of one of the relay switch contacts S1–S5.

S1 is a 1 ampere reed relay. When S1 is closed, link L1 provides connection between a DWG/R test point and the UUT pin. S2 is a 1 ampere reed relay. When S2 is closed, link L2 provides connection between a GSS test point and the UUT pin. S3 is a 5 ampere ½ crystal can relay. When it is closed, link L3 provides connection between a test point in the PSS and and UUT pin.

Links L4 and L5 provide a connection between an HFSS test point and the UUT pin. Link L5 is adapted to transmit a stimulus signal from an HFSS test point to the UUT pin, whereas link 4 is adapted to transmit the response signal emitted by the UUT pin. These links are more complex because they transmit signals of up to 100 MHz without distortion. Their impedance characteristics are accordingly matched with those of the HFSS. Coaxial wire having characteristic impedance of fifty ohms connects the HFSS test points with the multiplex circuits. The inner conductor of the coaxial cable extending from a given HFSS test point is connected directly to the relay contacts S6 of the associated multiplex circuit; the outer conductor is connected to ground G3. S4, S5 and S6 are standard one ampere reed relays.

Focusing attention on the high frequency links L4, L5, the resistor R3 connected to ground G2 is 50 ohms in order to terminate the driving source in the selected characteristic impedance. Because the UUT becomes a part of the circuit when connected, and can have nearly any impedance (probably its impedance will be insufficient to drive the impedance-matched 50 ohm circuit), link L4 contains additional elements to insure that impedance matching of 50 ohms is maintained. This is done so that a high frequency response signal emitted by the UUT will be faithfully transmitted back to the measurement device. To this end an impedance buffer I1 is physically positioned in the circuit as close as possible to the UUT (no more than seven inches). Its impedance on the UUT pin side (input side) is large (e.g. on the order of 100 megohms); its impedance on the HFSS side equals the characteristic impedance of 50 ohms. It will be understood that the impedance buffer minimizes the effect of impedance variations due to connection of the UUT, since the impedance of the UUT will always be negligible as compared with that of the input side of the impedance buffer. Thus the UUT pins are always terminated in the characteristic circuit impedance as seen by the measurement device.

Impedance buffer I1 is connected to the positive and negative voltage supplies V1, V2, and decoupled through Capacitors C4 and C5. Diodes D1 clamp the signal input level at a preselected value as a safety precaution for the protection of the impedance buffer. Resistances R1 and R2 act as an attenuator. These resistance elements may have identical values; in this case the voltage of any signal transmitted along link L4 is attenuated by half. Other attenuation ratios may also be used. Capacitors C1, C2, C3 and C6 form compensating networks to neutralize signal deteriorations due to stray capacitance and resistance present in the circuit. The values of C1, C2 and C3 depend upon the resistance values chosen for R1 and R2, according to the formula:

$$C_1 \times R_1 = R_2 \times (C_2 + C_3 + \text{Shunt Capacitance of the Impedance Buffer})$$

Resistance $R_4$ is adjusted to provide I1 with a 50 ohm output impedance. The following table sets forth representative values for the high frequency link components, and are understood to be typical values which give good performance in a practical embodiment:

| Component | Description |
|---|---|
| I1 | National Semiconductor LH0033 |
| V1, V2 | ± 15 volts DC |
| R1, R2 | 100 KΩ, typical |
| R3 | 50Ω |
| R4 | 0–50Ω, variable |
| C1, C2 | Selectable |
| C3 | 0–9 pf, variable |
| C4, C5 | 1 mf |
| D1 | 1N914 |

From inspection, it is seen that when relays S5 and S6 are used, a stimulus signal from a HFSS test point to a UUT pin will be transmitted. When relays S4 and S6 are used, a response signal from a UUT pin is transmitted to an HFSS test point. In alternate embodiments, the multiplex circuits may have additional relay links between UUT pin test points and various power loads or other circuitry.

Control of the relay switches is brought about by the multiplex software. This software constitutes part of the resident operating software of the computer 30 and comes into play in response to connection commands. It will be understood that operation of the relay switches S1–S6 may be made conditional upon certain events or upon the existing circuit status. For example, S3 and S5 (FIG. 1) should not be closed at the same time, and therefore the closing of one of those switches may be conditioned upon the other switch being open. If it is not, an error condition may be indicated until the operator corrects the ATLAS program or until the proper circuit status is automatically established by the software.

Figure 4A:
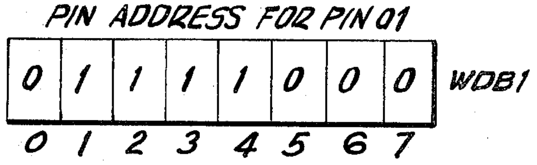
FIGS. 4A and 4B are diagrammatic representations of the computer data bytes useful in explaining how the computer operates the switches in the FIG. 1 circuit.
Figure 4B:
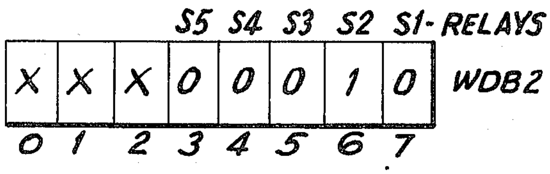

The multiplex relays are controlled by the generation of two data bytes: WDB1, WDB2, FIG. 4A, placed on the I/O bus 8. The first data byte WDB1 contains the UUT pin address (see the table of FIG. 5 — each address corresponds to one of the 256 multiplex circuits 31 as well as a UUT pin). The second data byte WDB2 specifies which relays are to be set for the multiplex circuit specified by WDB1; a "one" in a given bit position will close the designated relay, and a "zero" will open the relay. Both bytes are generated by the multiplex software according to the contents of a test program instruction. If a test program for instance specifies that 5 volts (a GSS stimulus) are to be applied to UUT PIN 01, the two data bytes WDB1 and WDB2 are 01111000 (pin address 78 is hexadecimal) and 00000010 (S2), respectively, as indicated in FIGS. 4A and 4B.

When the data bytes are transmitted from the computer I/O bus 8 to the logic element 44 of the multiplexer device controller 44, conventional digital logic circuits effect the opening and closing of multiplexer circuit relays in accordance with the contents of these data bytes. For a logic decoding circuit suitable for this purpose, see the aforesaid U.S. application Ser. No. 153.902.

Before transmission of these bytes to a given multiplex circuit, temporarily the operating software of the computer checks the computer memory for records of previous connections associated with that address; the computer will not effect connections which conflict with existing connections. If, for instance, a subsequent test instruction were to specify the closing of relay S1 in the same multiplex circuit, the computer would scan its table of recorded multiplex connections and would note the S2 connection; the software would then cause the generation of an error signal instead of effecting the transmission of the new WDB1 and WDB2 data bytes. Alternately, the software may cancel the old connection and permit the newly specified connection. In either event, an up-to-date record is maintained by the computer of existing multiplexer switch connections as they are made or broken. The availability of a CLEAR instruction in the test program language and the necessary operating software to effect such an instruction allows the opening of all relays previously closed in one or more multiplex circuits.

Although the invention has been described with reference to a preferred embodiment, certain modifications and variations are possible without departing from the invention. For example, in certain cases it may be possible to incorporate the function of the switches S1–S3 within the switching subsystems by appropriate operating software designed to control switches internal to the switching subsystems, rather than switches in the links L1–L3 of the multiplexer circuits 31 itself. In such case, it should be recognized that unwanted capacitance may be added to the UUT pin connection and for this reason the described embodiment is greatly preferred because it has universal application which effectively isolates innured circuits from those involved in the current test step.

What is claimed is:

1. Multiplex apparatus for use in automated diagnostic testing systems having electrical stimulus and measurement devices for the testing of an electrical UUT having at least four terminals comprising:

a. plural conductor means, each of said plural conductor means comprising plural electrical signal routes and adapted for unique association with one of said at least four UUT terminals, for establishing a circuit connection between each of said plural terminals of the UUT and a selected one of at least two respective test points associated with each such conductor means, at least two of said plural electrical signal routes of each of said plural conductor means having differing current transmission capability, and each of said plural electrical signal routes being for establishing a circuit connection between the associated UUT terminal and one of the at least two test points associated with its conductor means;

b. means for automatically connecting said respective test points to separate terminals of the stimulus and measurement devices so that any of said UUT terminals may be automatically connected to any of the spearate terminals of the stimulus and measurement devices, and so that a given one of the stimulus and measurement devices may simultaneously be connected to any number of the UUT terminals;

c. computer controllable switch means in each said electrical signal route for opening and closing each of said circuit connections;

d. device controller means responsive to electrical computer command signals for operating said switch means in accordance with said computer command signals; and e. computer control means in electrical connection with said device controller means for generating said electrical command signals.

2. Multiplex apparatus as claimed in claim 1, wherein a first one of the plural electrical signal routes of each conductor means has an impedance matched to that of the connecting means of the test point associated with such electrical signal route.

3. Multiplex apparatus as claimed in claim 2, wherein each said impedance matched electrical signal route comprises first and second electrical signal paths, alternately connectable by said electrical signal route switch means between the UUT terminal and the associated respective test points for transmitting and receiving electrical signals respectively to and from the UUT terminal.

4. Multiplex apparatus as claimed in claim 3, wherein the said receiving electrical signal paths comprise impedance buffering means.

5. Multiplex apparatus as claimed in claim 4, wherein each conductor means further comprises a second electrical signal route for transmitting electrical signals of up to approximately 5 amperes and a third electrical route for transmitting electrical signals of up to approximately one ampere in current.

6. Multiplex apparatus as claimed in claim 5, wherein there are at least three test points associated with each conductor means, the first of which is switchably connectable to a UUT terminal by said first electrical route of the associated conductor means, the second of which is switchably connectable to said UUT terminal by the second electrical route of the associated conductor means, and the third of which is switchably connectable to the UUT terminal by the third electrical route of the associated conductor means, and wherein the connecting means for each of the at least three test points associated with each conductor means comprises a switching subsystem having a plurality of selectable and electrically conductive buses such that: each of the associated test points is switchably connectable under control of said computer control means to a selected conductive bus, and such that each of a defined set of device terminals is also switchably connectable to such bus under control of said computer control means, whereby said associated test points may be connected to any device terminal in said defined set, a first switching sub-system being the connecting means for said first test points and for switching and transmitting electrical signals of up to approximately 120 megaHertz in frequency, a second switching subsystem being the connecting means for said second test points and for transmitting and switching electrical signals of up to approximately 5 amperes in current, and a third switching subsystem being the connecting means for said third test points and for transmitting and switching electrical signals of up to approximately one ampere in current.

7. Multiplexer apparatus as claimed in claim 6, wherein each said impedance buffering means of each said receiving electrical signal path is located within approximately 7 inches of the associated UUT terminal.

8. Multiplex apparatus as claimed in claim 7, wherein there are at least four test points associated with each conductor means, the fourth test points being switchably connected to a digital word generating and receiving device.

9. Multiplex apparatus as claimed in claim 4, wherein the said receiving electrical signal paths further comprise voltage attenuating means and means for manually varying the electrical capacitance and resistance of the paths.

10. A multiplexer circuit, adapted for unique association with a single terminal of a UUT, for selectably transmitting under computer control, electrical stimulus signals generated by various stimulus devices to the associated terminal of the UUT and response signals emitted at the terminal of the UUT to various measurement devices comprising: plural electrical signal transmission routes of varying current carrying ability, each said electrical signal transmission route including switching means and adapted for switchable connection thereby to a designated test point.

11. A multiplexer circuit as claimed in claim 10, wherein at least one of said plural electrical transmission routes has components which are impedance matched with each other.

12. A multiplexer circuit as claimed in claim 11, wherein each said impedance matched electrical signal transmission route comprises two switchable electrical paths, alternately connectable between the associated test point and UUT terminal, a first switchable electrical path for transmitting high frequency electrical stimulus signals to the terminal of the UUT and a second such path for transmitting high frequency response signals emitted at the terminal of the UUT to the test point.

13. A multiplexer circuit as claimed in claim 12, wherein each said second switchable electrical path comprises impedance buffering means.

* * * * *